(12) United States Patent
Baqai et al.

(10) Patent No.: US 8,836,824 B2
(45) Date of Patent: Sep. 16, 2014

(54) SYSTEMS AND METHODS FOR THRESHOLD-BASED LUMA CHANNEL NOISE REDUCTION

(75) Inventors: Farhan A. Baqai, Fremont, CA (US); Ralph Brunner, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 528 days.

(21) Appl. No.: 13/151,967

(22) Filed: Jun. 2, 2011

(65) Prior Publication Data

US 2012/0307110 A1 Dec. 6, 2012

(51) Int. Cl.
*H04N 5/217* (2011.01)
*H04N 5/21* (2006.01)
*G06K 9/40* (2006.01)

(52) U.S. Cl.
CPC .................. *H04N 5/21* (2013.01); *H04N 5/217* (2013.01); *G06K 9/40* (2013.01)
USPC ........................................................ 348/241

(58) Field of Classification Search
USPC ........................................................ 348/241
See application file for complete search history.

(56) References Cited

U.S. PATENT DOCUMENTS

| | | |
|---|---|---|
| 2008/0291298 A1 | 11/2008 | Kim et al. |
| 2008/0292202 A1 | 11/2008 | Vakrat |
| 2009/0161019 A1 | 6/2009 | Jang |
| 2009/0251570 A1 | 10/2009 | Shi |
| 2011/0052091 A1 | 3/2011 | Zimmer |

*Primary Examiner* — Usman Khan
(74) *Attorney, Agent, or Firm* — Wong, Cabello, Lutsch, Rutherford & Brucculeri, LLP

(57) ABSTRACT

Systems, methods, and computer readable media for removing noise from the luminance (luma) channel in a digital image represented in the YUV color space are described. In general, an element from the luma channel may be selected and a region about that element defined. Using a threshold that is based on the selected luma element's value, similar luma values within the defined region may be identified and combined to provide a substitute value. The substitute value may be blended with the value of the selected element within the image's luma channel. In another implementation, element values from both an image's luma and chroma channels may be used to identify similar luma values.

28 Claims, 5 Drawing Sheets

SYSTEMS AND METHODS FOR THRESHOLD-BASED LUMA CHANNEL NOISE REDUCTION

BACKGROUND

This disclosure relates generally to the field of image processing. More particularly, this disclosure relates to reducing noise in the luminance channel of a captured image.

Today, many personal electronic devices come equipped with digital cameras. Often, these devices perform many functions, and, as a consequence, the digital image sensors included in these devices must often be smaller than sensors in conventional or dedicated digital cameras. The digital image sensor, such as a charge-coupled device (CCD), of a digital camera has a plurality of photo-sites arranged in a colored filtered array or pattern, such as a RGB Bayer pattern. In the RGB Bayer pattern, each photo-site is filtered so that it is receptive to either: red, green, blue, or some variation thereof. The type of colored filter array and digital imaging sensor varies, typically based on the manufacturer of the digital camera. For example, some color filtered arrays use a pattern of yellow, cyan, green, and magenta. Typically, the digital camera has an image pipeline that performs a demosaicing or de-Bayering process on the image, lens correction, and noise reduction. The image pipeline then performs RGB gamma correction and tone mapping on the image data and encodes the image into the YCbCr family of color spaces or other format suitable for displaying and viewing.

Various considerations must be addressed when processing a digital image obtained with a digital camera, digital video camera, or other imaging device. One consideration involves the large amount of image noise resultant from the use of small camera sensors, due to their typically smaller image sensor sites. Increased noise in pixels is typically caused by the random arrival times of visible light photons to the sensor photo-sites, but may also be caused by the process of reading the pixel values from the sensor photo-sites, or for any number of other reasons, and is usually made worse by low light conditions. Although noise can lead to a grainy appearance in images due to the pattern of the color filter array, increased noise also leads to increased false colors in images.

To compensate for reduced performance in smaller camera sensors, various processing techniques may be implemented. However, most existing noise reduction techniques either produce a blotchy appearance in the images or are too computationally expensive to be used. Thus, there is need for a low computational cost system and method for reducing noise effects in image capturing applications to create more visually appealing images.

SUMMARY

In one embodiment the invention provides a method to reduce noise in the luma channel of a digital image. The method includes obtaining a digital image having a luma channel. For example, the image may be represented in the YUV color space. A first element, having a first value, may then be selected from the luma channel and a threshold for determining similarity between the first element and other luma elements may be chosen. Next a region is identified that includes a first plurality of luma elements, including the first element. For each luma element in the region, the threshold is used to determine if it is similar to the first element. If an element is similar, its value is added to a running sum. If the element is not similar, a specified value may be added to the running sum. Once all elements in the identified region have been evaluated for their similarity to the first element, the running sum may be used to generate a second value—the second value replacing the first element's value in the luma channel. In one embodiment, the second sum may be a straight average or a weighted average of its constituent values. This operation may be performed for each element in the luma channel.

In one embodiment, the chosen threshold is a piecewise linear function of the selected element's luma value. In another embodiment, the chosen threshold may be a step function. In still another embodiment, chroma values corresponding to the first element and the elements within the identified region may also be used to determine whether a particular luma element is similar to the first element. In addition, the identified region may be symmetrical or asymmetrical with respect to the chosen element and may have any number of elements in it.

Methods in accordance with this disclosure may be embodied as computer program instructions or code and stored on a non-transitory storage device. In like fashion, methods in accordance with this disclosure may be implemented in hardware, software, or a combination thereof and embodied in a personal electronic device such as a digital camera, mobile phone or the like.

DETAILED DESCRIPTION

Figure 1:
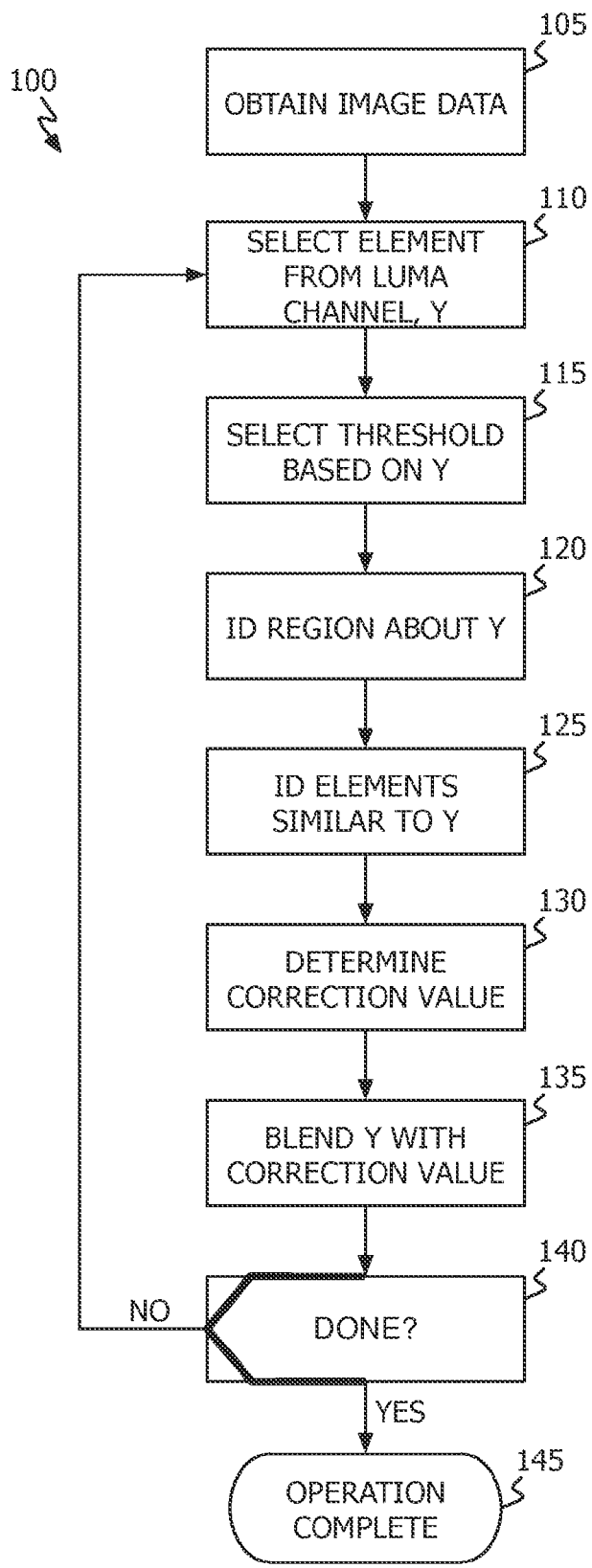
FIG. 1 shows, in flowchart form, a luma channel noise reduction operation in accordance with one embodiment.

This disclosure pertains to systems, methods, and computer readable media for removing noise from the luminance (luma) channel in a digital image represented in the YUV color space. In one embodiment, an element from the luma channel is selected and a region about that element in the luma channel defined. Using a threshold that is a function of the selected luma element's value, similar luma values within the defined region may be identified and combined. The combined value may be used to generate a correction value. For example, the correction value could be the average (weighted or not) of the combined values. This value represents a "smoothed" version of elements in the region that are similar to the selected element and may be blended with the selected element's value in the luma channel in accordance with some function. One illustrative blend function may be to replace the selected element's value with the generated average value. Another illustrative blend function may be given as:

$$Y\_out = Y\_orig * alpha + Y\_correction * (1-alpha),$$

where Y_orig is the original luma value of the selected element, Y_correction represents the correction value, and alpha represents a blend value. For example, alpha may be 0.5 or 0.2 or 0.8. In another embodiment, element values from both the luma and chroma channels may be used to identify similar luma elements. As before, luma elements identified as similar may be combined. The disclosed techniques permit real-time noise filtering operations on the luma channel of an image represented in the YUV color space. Such operations may be particularly useful to electronic devices that have a relatively limited processing capacity.

In the following description, for purposes of explanation, numerous specific details are set forth in order to provide a thorough understanding of the inventive concept. As part of this description, some structures and devices may be shown in block diagram form in order to avoid obscuring the invention. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals will vary from one implementation to another. It will also be appreciated that such development efforts might be complex and time-consuming, but would nevertheless be a routine undertaking for those of ordinary skill in the image processing field having the benefit of this disclosure.

Referring to FIG. 1, luma channel noise reduction operation 100 in accordance with one embodiment begins by obtaining image data (block 105). An element (Y) from within the image's luma channel may be selected (block 110) and a threshold based on the value of Y may be chosen (block 115). As will be discussed in more detail below, the selected threshold may be used to identify "similar" pixels. A region about the selected Y element may be defined (block 120) and, using the selected threshold, similar luma elements within the region may be identified (block 125). From the identified elements, a correction value is determined (block 130). The correction value represents a filtered version of the selected luma element. That is, a value in which the estimated noise present in selected luma element Y has been removed. The correction value may then be blended with the selected luma element's value in the image's luma channel (block 135) in accordance with some function. If all elements in the image's luma channel have been processed in accordance with blocks 110-135 (the "YES" prong of block 140), operation 100 is complete (block 145). If at least one luma element from the image's luma channel remains to be processed (the "NO" prong of block 140), processing resumes at block 110. In one embodiment, each and every element in an image's luma channel may be selected for processing in accordance with operation 100. In another embodiment, fewer than all elements from the image's luma channel may be processed. For example, luma elements along the edge (i.e., outer periphery) of the image channel may not be processed.

Figure 2:
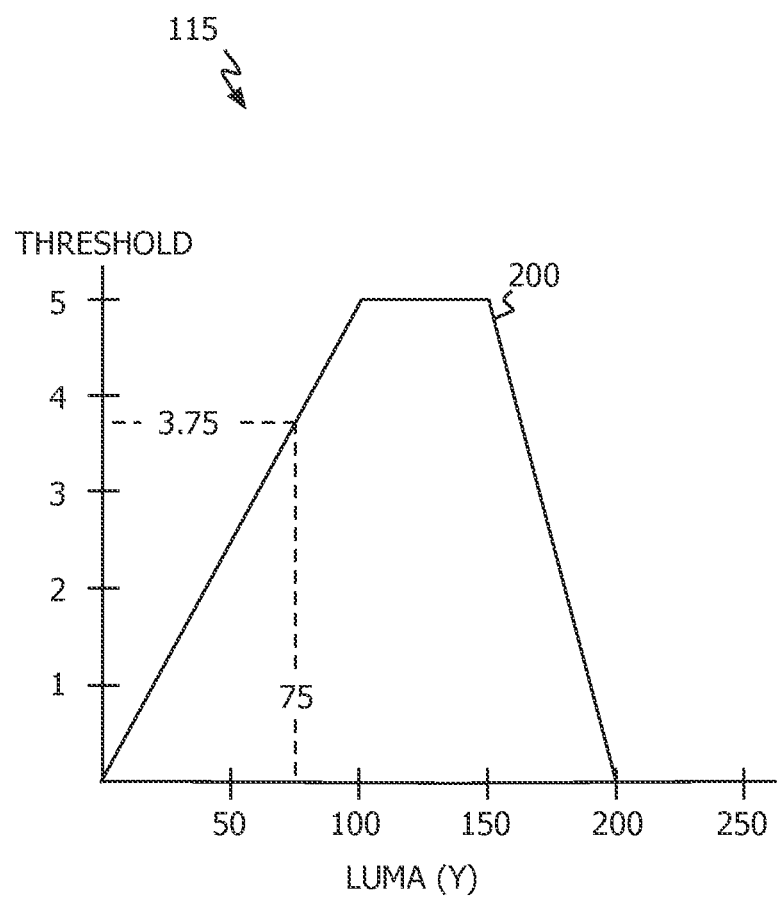
FIG. 2 shows a threshold function in accordance with one embodiment.

Referring to FIG. 2, acts in accordance with block 115 may use any number of luma-based threshold values. An illustrative threshold function 200 is shown for luma channel elements represented by 8-bit values (e.g., having values from 0 to 255). It has been recognized that the precise threshold values chosen are important to optimal noise reduction. Piece-wise linear threshold 200 permits the adjustment of the selected threshold within these three regions. It will be understood that the precise slopes and transition points (as well as the number of distinct regions) may vary from implementation to implementation.

Referring to FIG. 3, region identification in accordance with block 120 may be made in a number of ways. In FIG. 3A, for example, a 5×5 regions distributed symmetrically about selected luma element Y is shown. In FIG. 3B, an asymmetrical region is shown. In FIG. 3C, a symmetrical region with a number of elements removed from consideration (identified by diagonal lines) may be used. A benefit of this latter approach is that it permits the number of elements in a region to be restricted to a power of two. It may be noted that in this case (FIG. 3C) the selected luma element Y is not included in the neighborhood. That said, it is likely to be included as one of the neighbors that are outside the threshold (in place of dissimilar pixels), and if it is not, then the region being evaluated is a very smooth area of the image. More on this will be discussed below with respect to block 130. Referring to FIG. 3D, 3×3 region 300 is shown about selected luma element Y that occurs at the edge of luma channel 305. In the illustrated embodiment, when region 300 is defined about elements at the luma channel boundaries (e.g., element Y), element values within luma channel 305 may be "mirrored" across the boundary. Thus, element $A_m$ (which is outside luma channel 405) represents the mirror of value A (which is inside luma channel 405). In like fashion, values $B_m$ and $Y_m$ represent mirrored values of luma elements Y and B respectively.

Figure 3A:
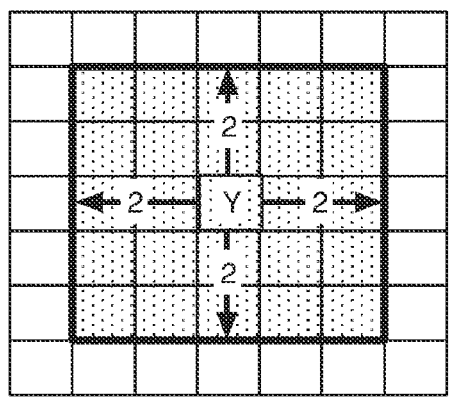
FIGS. 3A-3D show illustrative regions that may be used in accordance with the disclosed embodiments.
Figure 3B:
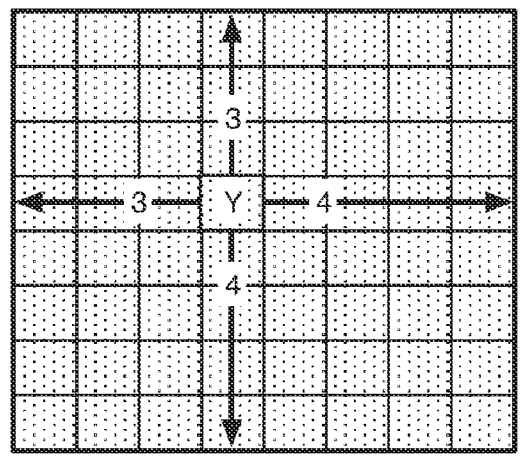
Figure 3C:
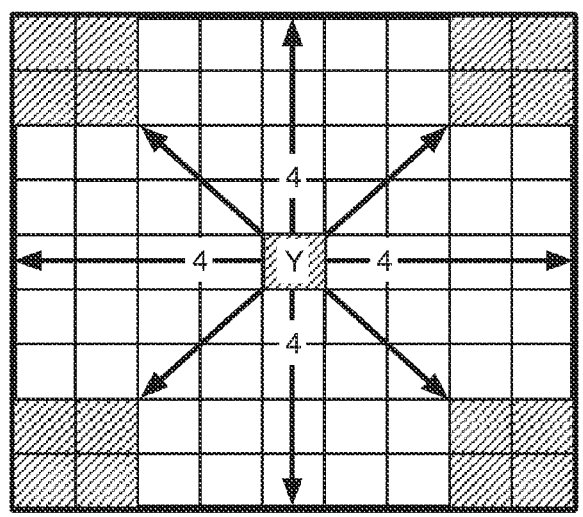
Figure 3D:
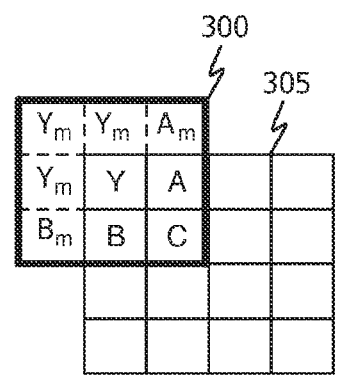

Luma elements similar to the selected element (Y) may also be made in a number of ways (i.e., acts in accordance with block 125). In one embodiment, each luma element in the region defined in accordance with block 120 is compared to the selected element and, if the difference is "small enough" that element may be classified as similar. This approach may, for example, be employed when regions are defined as shown in FIGS. 3A and 3B. As used herein, the phrase "small enough" is in relation to the selected threshold. Referring to FIG. 2, for example, if the selected luma element has a value of 75, the corresponding threshold may be 3 in accordance with threshold function 200. In this case, all elements within the prescribed region about element Y whose value is within 3 may be considered "similar." This relationship may be shown more precisely as follows:

$$\text{If } |Y-x_i| \leq T_Y \text{ then } x_i \text{ is similar to } Y, \text{ else } x_i \text{ is not similar,} \qquad \text{EQ. 1}$$

where Y represents the value of the luma element being processed (i.e., selected in accordance with block 110), $x_i$ represents the value of a luma element within the region identified in accordance with block 120, and $T_Y$ represents the threshold corresponding to luma element Y (e.g., via threshold function 200). In another embodiment, the pair-wise comparison in accordance with EQ. 1 may be made for all elements within the identified region except for those elements specifically excluded. This approach is more applicable for regions defined as illustrated in FIG. 3C.

In another embodiment, values from both the luma and chroma channels may be used to identify similar elements. This may be particularly useful, for example, when the region under consideration is heavily textured or is at the boundary between a smooth region and a textured region. Embodiments in accordance with this approach may identify a luma element within the identified region as being similar to the selected luma element as follows:

$$\text{If } |Y-x_i|<T_Y \&\& |Cb_Y-Cb_i|<T_{Cb} \&\& |Cr_Y-Cr_i|<T_{Cr} \text{ then} \qquad \text{EQ. 2}$$

$x_i$ is similar to Y, else $x_i$ is not similar, where Y, $x_i$ and $T_Y$ are as described above, $Cb_Y$ represents the image's Cb chroma channel value corresponding to luma element Y, $Cb_i$ represents the image's Cb chroma channel value corresponding to luma element $x_i$, $T_{Cb}$ represents the threshold for the Cb chroma channel based on the $Cb_Y$ value, $Cr_Y$ represents the image's Cr chroma channel value corresponding to luma element Y, $Cr_i$ represents the image's Cr chroma channel value corresponding to luma element $x_i$, $T_{Cr}$ represents the threshold for the Cr chroma channel based on the $Cr_Y$ value, and "&&" represents a logical and operation. It will be recognized that in a YUV representation, an image's chroma channels are sub-sampled in relation to the image's corresponding luma channel. This means that a single chroma element may correspond to a plurality of luma channel elements. Chroma thresholds $T_{Cb}$ and $T_{Cr}$ may be determined in the same manner as TY. That is, any function may be used as long as it provides visually acceptable results.

In one embodiment, operations in accordance with block 130 record a running sum of every luma value in the identified region (see block 120) that is similar to the selected luma element Y (subject to the caveats discussed above and illustrated in FIG. 3). After all relevant luma values in the identified region are accounted for in this manner, the resulting sum may be, for example, divided by the number of similar elements to generate an "average" similar luma value. This value may be used in accordance with block 135 and blended with selected luma element Y in the luma channel. In another embodiment a weighted sum may be used wherein luma values that are closer to the value of Y are given more weight that those luma values less close. Other weighting factors will be apparent to those of ordinary skill.

Figure 4:
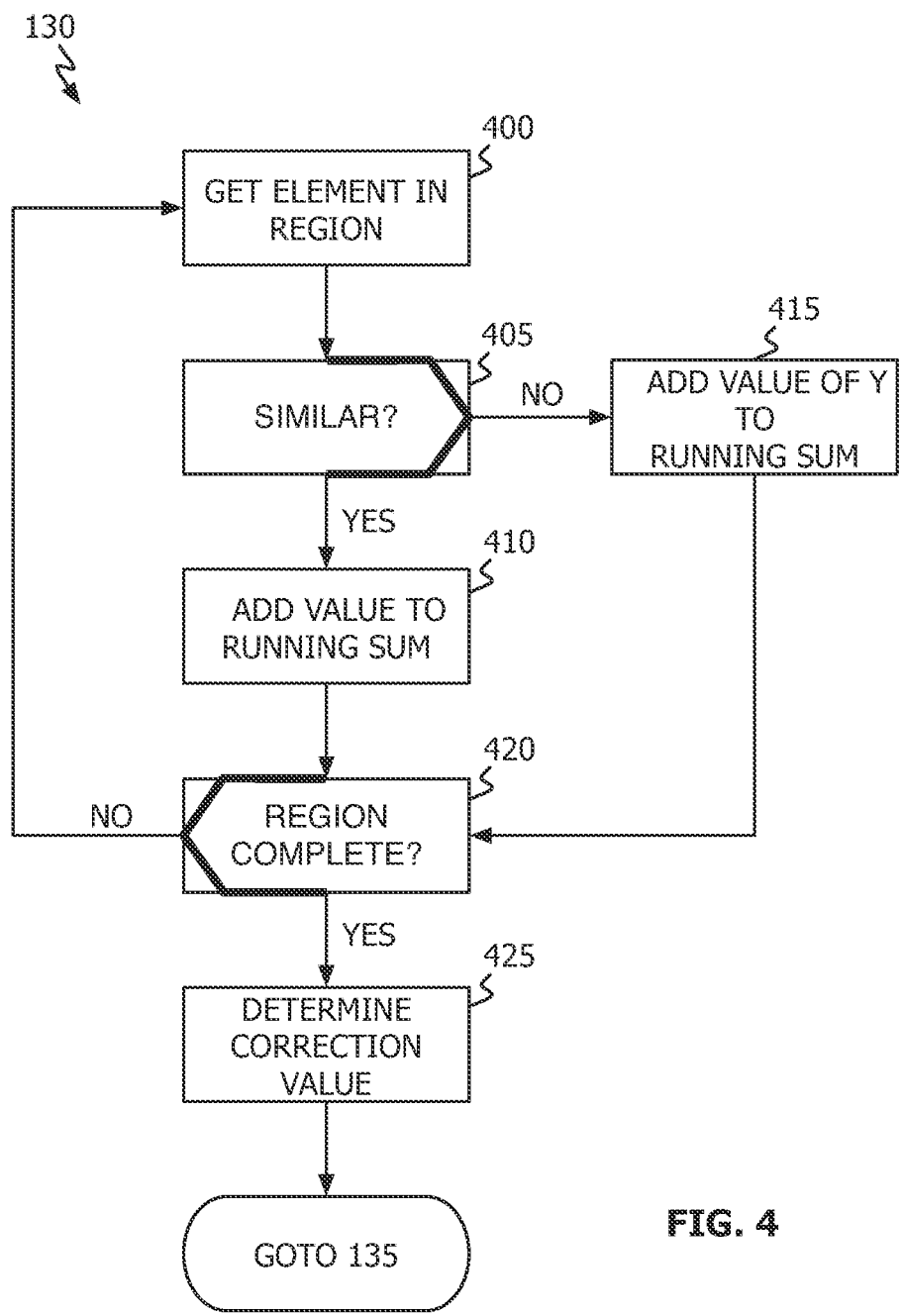
FIG. 4 shows, in flowchart form, a similar pixel combination operation in accordance with one embodiment.

Referring to FIG. 4, in other embodiments determining a luma channel correction value in accordance with block 130 may take into account similar and dissimilar luma values within the identified region (see discussion above, for example, with respect to EQS. 1 and 2). In these embodiments, each relevant element in the identified region is obtained (block 400) and checked (block 405). If the element is similar to the selected luma element Y (the "YES" prong of block 405), the value of the similar luma channel element is added to a running sum for the region (block 410). If the element is not similar to Y (the "NO" prong of block 405), the value of element Y may be added to the running sum for the region (block 415). If all elements in the identified region have been visited in this manner (the "YES" prong of block 420), the resulting running sum (which, recall, may be a weighted sum) may be used to determine a correction value (block 425). For example, the running sum may be divided by the number of elements in the identified region, whereafter operation 100 continues at block 135. If elements remain to be reviewed in the identified region (the "NO" prong of block 420), operation 130 continues at block 400.

Embodiments in accordance with FIG. 4 permit the number of elements used to determine a correction value to remain constant. When used in combination with regions that include a power of 2 number of elements, operations in accordance with block 425 may be performed by shift operations. As well be recognized, shift operations are significantly faster than general division operations. Accordingly, implementations in accordance with FIG. 4 may be particularly fast. (It is noted that while chroma channel values may be used to determine when two luma elements are similar, only luma channel values are used in accordance with block 130.)

It was noticed that generating luma correction values using only "similar" elements could result in image areas that exhibited uneven smoothing. For example, because noise within the selected threshold is removed completely, while not-so-frequent noise outside the threshold remains, sometimes the filtered image exhibited "sprinkles." That is, there could be visible spikes in smooth regions of an image. In addition, adding the selected luma element Y in place of a dissimilar pixel makes the operation more stable. This is especially important in dark regions and texture, where the number of similar elements within a region could be very small. An estimate solely based on similar pixels could be statistically unstable. Adding the value of the selected element possibly multiple times or, in other words, blending de-noised and original pixels, helps avoid the problem of having a statistically weak sample size. The outcome helps maintain texture in the image resulting in a more natural looking filtered/smoother image.

Figure 5:
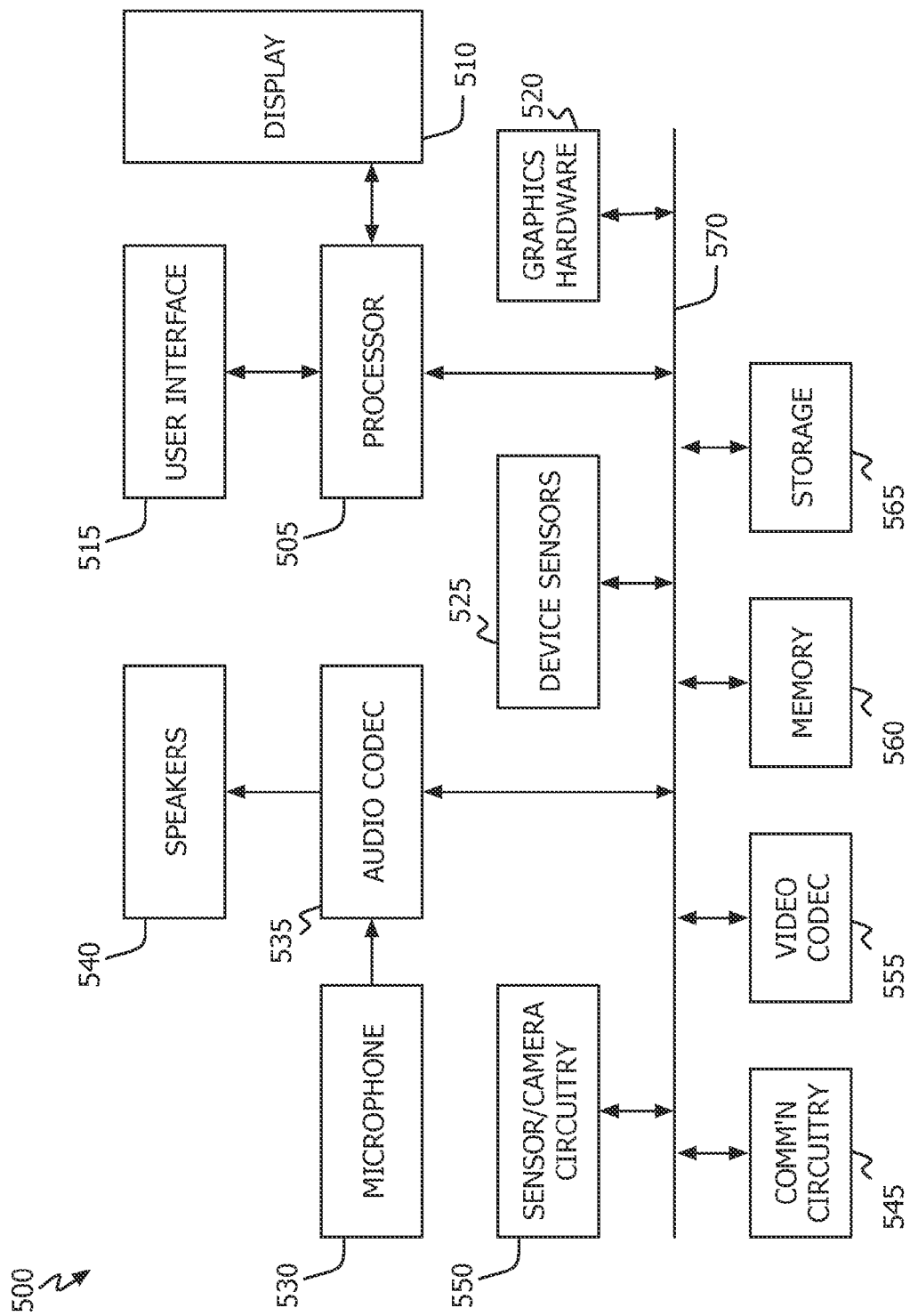
FIG. 5 shows, in block diagram form, an electronic device in accordance with one embodiment.

Referring now to FIG. 5, a simplified functional block diagram of electronic device 500 incorporating graphics processing capabilities as disclosed herein is shown according to one embodiment. Electronic device 500 may include processor 505, display 510, user interface 515, graphics hardware 520, device sensors 525 (e.g., proximity sensor/ambient light sensor), microphone 530, audio codec(s) 535, speaker(s) 540, communications circuitry 545, image sensor with associated camera hardware 550, video codec(s) 555, memory 560, storage device 565, and communications bus 570. Electronic device 500 may be, for example, a digital image capture device, a personal electronic device such as a personal digital assistant (PDA), personal music player, mobile telephone, or a workstation, desktop, notebook or tablet computer system.

Processor 505 may be any suitable programmable control device and may control the operation of many functions, such as the generation and/or processing of graphics data, as well as other functions performed by electronic device 500. Processor 505 may represent one or more processing units and include special purpose computational hardware. Processor 505 may drive display 510 and receive user inputs from user interface 515. User interface 515 may allow a user to interact with electronic device 500. For example, user interface 515 can take a variety of forms, such as a button, keypad, dial, a click wheel, keyboard, display screen and/or a touch screen.

Processor 505 may include any programmable controller device including, for example, one or more members of the Intel Atom®, Core®, Pentium and Celeron® processor families from Intel Corporation and the Cortex and ARM processor families from ARM or custom designed state machines. (INTEL, INTEL ATOM, CORE, PENTIUM, and CELERON are registered trademarks of the Intel Corporation. CORTEX is a registered trademark of the ARM Limited Corporation. ARM is a registered trademark of the ARM Limited Company.) Processor 505 may also be implemented via custom designed state machines that can be embodied in a hardware device such as an application specific integrated circuits (ASICs) and field programmable gate array (FPGAs). Graphics hardware 520 may be special purpose computational hardware for processing graphics and/or assisting processor 505 to process graphics information. In one embodiment, graphics hardware 520 may include a programmable graphics processing unit (GPU).

Sensor and camera circuitry 550 may capture still and video images that may be processed, at least in part, by video codec(s) 555 and/or processor 505 and/or graphics hardware 520. Images so captured may be stored in memory 560 and/or storage 565. Memory 560 may include one or more different types of media used by processor 505 and graphics hardware 520 to perform device functions. For example, memory 560 may include memory cache, read-only memory (ROM), and/or random access memory (RAM). Storage 565 may store media (e.g., audio, image and video files), computer program instructions or software, preference information, device profile information, and any other suitable data. Storage 565 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 560 and storage 565 may be used to tangibly retain computer program instructions or code organized into one or more modules and written in any desired computer programming language. When executed by, for example, processor 505 such computer program code may implement one or more of the methods described herein.

Communications bus 570 may provide a data transfer path for transferring data to, from, or between at least sensor and camera circuitry 550, memory 565, processor 505, graphics hardware 520 and storage device 565.

Various changes in the materials, components, circuit elements, as well as in the details of the illustrated operational methods are possible without departing from the scope of the following claims. For instance, operations in accordance with FIGS. 1 and 3 may be performed in a different order than those illustrated. For example, acts in accordance with block 115 and 120 may be done in reversed order. In addition, one or more acts shown as separate in FIGS. 1 and 3 may be combined into a single step. Similarly, an act represented as a single step in these figures may be divided into a number of steps. Further, a threshold determination function other than that represented in FIG. 2 may be used. On this point, it will be recognized that the precise threshold function chosen may be a function of the nature and characteristics of the particular digital image capture device being used. Also, regions identified in accordance with block 120 may take on shapes other than those identified in FIG. 3.

Finally, it is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method to reduce noise in a digital image, comprising:
obtaining, by a computer, a luma channel of an image;
selecting, by the computer, a first element having a first value from the luma channel;
selecting, by the computer, a threshold based on the first value;
identifying, by the computer, a region encompassing a first plurality of elements in the luma channel, each of the first plurality of elements having a corresponding value, the first plurality of elements including the first element;
for each value of an element in the first plurality of elements that is similar to the first value based on the threshold, adding, by the computer, the element's corresponding value to a sum, else adding a specified value to the sum;
determining, by the computer, a second value based on the sum; and
blending, by the computer, the first value in the luma channel with the second value.

2. The method of claim 1, wherein the acts of selecting a first element, selecting a threshold, identifying a region and adding are repeated for each element in the luma channel.

3. The method of claim 2, further comprising resetting, by the computer, the sum to zero after the act of replacing for each element in the luma channel.

4. The method of claim 1, wherein the act of selecting a threshold comprises selecting a threshold that is a piece-wise linear function of the value of the first element.

5. The method of claim 1, wherein the act of identifying a region comprises identifying a region that is symmetrically arranged around the first element in the luma channel.

6. The method of claim 1, wherein the act of identifying a region comprises identifying a region that includes a power of 2 number of elements in the luma channel.

7. The method of claim 6, wherein the act of adding a specified value to the sum comprises adding the first value to the sum.

8. The method of claim 7, wherein the act of determining a second value based on the sum comprises dividing the sum by the number of elements in the first plurality of elements.

9. The method of claim 8, wherein the act of dividing comprises performing a shift operation on the sum.

10. The method of claim 1, wherein the act of adding a specified value to the sum comprises adding zero to the sum.

11. The method of claim 10, wherein the act of dividing comprises dividing the sum by the number of times a non-zero value was added to the sum.

12. The method of claim 1, wherein the act of obtaining a luma channel of an image further comprises obtaining a chroma channel of the image.

13. The method of claim 12, wherein the act of selecting a first element further comprises selecting a first chroma element, having a first chroma value, from the chroma channel.

14. The method of claim 13, wherein the act of selecting a threshold further comprises selecting a first chroma threshold based on the first chroma value.

15. The method of claim 14, wherein a luma element, having a luma value, from the first plurality of elements is similar to the first element only if—
the luma value is similar to the first value based on the threshold; and
a chroma element corresponding to the luma element is similar to the first chroma element based on the first chroma threshold.

16. The method of claim 1, wherein the act of blending comprises replacing the first value in the luma channel with the second value.

17. A non-transitory program storage device having stored thereon program code to cause a programmable control device to:
obtain a luma channel of an image;
select a first element having a first value from the luma channel;
select a threshold based on the first value;
identify a region encompassing a first plurality of elements in the luma channel, each of the first plurality of elements having a corresponding value, the first plurality of elements including the first element;
for each value of an element in the first plurality of elements that is similar to the first value based on the threshold add the element's corresponding value to a sum, else add a specified value to the sum;
determine a second value based on the sum; and
blend the first value in the luma channel with the second value.

18. The non-transitory program storage device of claim 17, wherein the program code to select a first element, select a threshold, identify a region and add are executed once for each element in the luma channel.

19. The non-transitory program storage device of claim 17, wherein the program code to select a threshold comprises program code to select a threshold that is a piece-wise linear function of the value of the first element.

20. The non-transitory program storage device of claim 17, wherein the program code to identify a region comprises program code to identify a region that is symmetrically arranged around the first element in the luma channel.

21. The non-transitory program storage device of claim 17, wherein the program code to identify a region comprises program code to identify a region that includes a power of 2 number of elements in the luma channel.

22. The non-transitory program storage device of claim 21, wherein the program code to add a specified value to the sum comprises program code to add the first value to the sum.

23. The non-transitory program storage device of claim 22, wherein the program code to determine a second value based on the sum comprises program code to divide the sum by the number of elements in the first plurality of elements.

24. The non-transitory program storage device of claim 23, wherein the program code to divide comprises program code to perform a shift operation on the sum.

25. The non-transitory program storage device of claim 17, wherein the program code to add a specified value to the sum comprises program code to add zero to the sum.

26. The non-transitory program storage device of claim 25, wherein the program code to divide comprises program code to divide the sum by the number of times a non-zero value was added to the sum.

27. The non-transitory program storage device of claim 17, wherein the program code to blend comprises program code to replace the first value in the luma channel with the second value.

28. An electronic device, comprising:
an image sensor;
a memory operatively coupled to the image sensor; and
a programmable control device adapted to execute program code stored in the memory to perform the method of claim 1.

* * * * *